United States Patent
Salvador et al.

(10) Patent No.: US 8,647,785 B2
(45) Date of Patent: Feb. 11, 2014

(54) DYNAMIC VOLTAGE SUPPRESSION IN A FUEL CELL SYSTEM

(75) Inventors: John P. Salvador, Penfield, NY (US); Thomas A. Greszler, Fairport, NY (US); Brian A. Litteer, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 306 days.

(21) Appl. No.: 13/107,526

(22) Filed: May 13, 2011

(65) Prior Publication Data

US 2012/0064423 A1     Mar. 15, 2012

Related U.S. Application Data

(60) Provisional application No. 61/382,724, filed on Sep. 14, 2010.

(51) Int. Cl.
     *H01M 8/04*      (2006.01)

(52) U.S. Cl.
     USPC .......................................... 429/432; 429/430

(58) Field of Classification Search
     None
     See application file for complete search history.

(56) References Cited

U.S. PATENT DOCUMENTS

| | | | |
|---|---|---|---|
| 6,713,020 B2 * | 3/2004 | Kato et al. | 422/98 |
| 2006/0147770 A1 * | 7/2006 | Krause | 429/23 |

OTHER PUBLICATIONS

Neyerlin et al., "Determination of Catalyst Unique Parameters for the Oxygen Reduction Reaction in a PEMFC", Journal of Electrochemical Society, 153 (10) A1955-A1963 (2006).*

* cited by examiner

*Primary Examiner* — Milton I Cano
*Assistant Examiner* — Carmen Lyles-Irving
(74) *Attorney, Agent, or Firm* — John A. Miller; Miller IP Group, PLC

(57) ABSTRACT

A system and method for determining a maximum average cell voltage set-point for fuel cells in a fuel cell stack that considers oxidation of the catalyst in the fuel cells. The method includes determining the average cell voltage, the stack current density (I) and an internal resistance (R) of membranes in the fuel cells to calculate an IR corrected average cell voltage. The IR corrected average cell voltage is then used to determine the oxidation state of the catalyst particles using, for example, an empirical model. The oxidation state of the particles is then used to calculate the maximum average cell voltage set-point of the fuel cells, which is used to set the minimum power requested from the fuel cell stack.

12 Claims, 2 Drawing Sheets

DYNAMIC VOLTAGE SUPPRESSION IN A FUEL CELL SYSTEM

CROSS-REFERENCE TO RELATED APPLICATIONS

This application claims the benefit of the filing date of U.S. Provisional Application No. 61/382,724, titled Dynamic Voltage Suppression in a Fuel Cell System, filed Sep. 14, 2010.

BACKGROUND OF THE INVENTION

1. Field of the Invention

This invention relates generally to a system and method for determining a maximum cell voltage for fuel cells in a fuel cell stack and, more particularly, to a system and method for determining a maximum cell voltage for fuel cells in a fuel cell stack that includes determining the oxidation state of the fuel cell catalyst so that the maximum stack voltage set-point can be adjusted during operation of the fuel cell system to minimize platinum catalyst surface area loss.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte there between. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. A PEMFC generally includes a solid polymer electrolyte proton conducting membrane, such as a perfluorosulfonic acid membrane. The anode and cathode typically, but not always, include finely divided catalytic particles, usually a highly active catalyst such as platinum (Pt) that is typically supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation Several fuel cells are typically combined in a fuel cell stack to generate the desired power. For example, a typical fuel cell stack for a vehicle may have two hundred or more stacked fuel cells. The fuel cell stack receives a cathode reactant input gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant input gas that flows into the anode side of the stack.

A fuel cell stack typically includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow fields are provided on the anode side of the bipolar plates that allow the anode reactant gas to flow to the respective MEA. Cathode gas flow fields are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

It is known that a typical fuel cell stack will have a voltage loss or degradation over the lifetime of the stack. It is believed that the fuel cell stack degradation is, among other things, a result of voltage cycling of the fuel cells in the stack. Voltage cycling occurs when the platinum catalyst particles used to enhance the electro-chemical reaction transition between a low and high potential state, which promotes dissolution of the particles. Dissolution of the particles results in loss of active surface area and performance degradation.

Many factors influence the relative loss in surface area of the platinum particles relating to voltage cycling, including peak stack voltage, temperature, stack humidification, voltage cycling dynamics, etc. Lower stack voltage set-points offer greater protection against degradation, but higher stack voltage set-points provide increased system efficiency. Thus, the control for various fuel cell systems often requires the stack to at least operate at a minimum power level so that, in at least one case, the cell voltages are prevented from rising too high because frequent voltage cycles to high voltage can cause a reduction in the active platinum surface area of the cathode and anode electrodes, as discussed above.

Typically, in known fuel cell systems, a fixed voltage limit is used to set the stack minimum power level to prevent unwanted voltage cycling. For example, a typical voltage suppression strategy may use a fixed voltage set-point, such as 850-900 mV, and prevent the stack voltage from rising above that value. If the fuel cell power controller is not requesting power, or is requesting minimal power, the power generated by the stack necessary to maintain the cell voltage levels at or below the fixed voltage set-point is provided to certain sources where the power is used or dissipated. For example, the excess power may be used to charge a high voltage battery in a fuel cell system vehicle. U.S. Patent Application Publication No. US 2006/014770 A1, published Jul. 6, 2006, titled Reduction of Voltage Loss Caused by Voltage Cycling by Use of A Rechargeable Electric Storage Device, assigned to the assignee of this application and herein incorporated by reference, discloses a fuel cell system that charges a vehicle battery in order to maintain the cell voltage below a predetermined fixed voltage set-point.

If the voltage set-point is relatively high, then the system may often charge the battery, which could cause the battery charge to be at its maximum more often. If the battery is at its maximum charge and cannot except more charging power, then the controller may cause the excess power to be dissipated in other components, such as resistors, in the form of heat to maintain the cell voltage below the maximum voltage set-point, which effects system efficiency as a result of wasting hydrogen fuel.

SUMMARY OF THE INVENTION

In accordance with the teachings of the present invention, a system and method are disclosed for determining a maximum average cell voltage set-point for fuel cells in a fuel cell stack that considers oxidation of the catalyst in the fuel cells. The method includes determining the average cell voltage, the stack current density (I) and an internal resistance (R) of membranes in the fuel cells to calculate an IR corrected average cell voltage. The IR corrected average cell voltage is then used to determine the oxidation state of the catalyst particles using, for example, an empirical model. The oxidation state of the particles is then used to calculate the maximum average cell voltage set-point of the fuel cells, which is used to set the minimum power requested from the fuel cell stack.

Additional features of the present invention will become apparent from the following description and appended claims, taken in conjunction with the accompanying drawings.

DETAILED DESCRIPTION OF THE EMBODIMENTS

Figure 1:
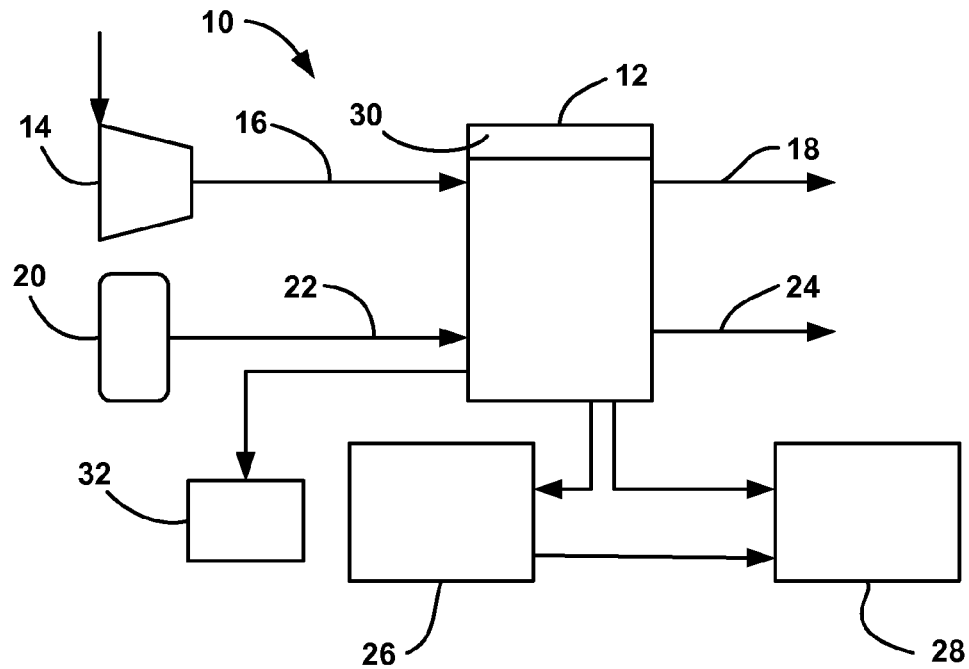
FIG. 1 is a simplified block diagram of a fuel cell system.

The following discussion of the embodiments of the invention directed to a system and method for determining a maximum cell voltage set-point for fuel cells in a fuel cell stack that includes determining the oxidation state of the fuel cell catalyst to minimize platinum catalyst surface area loss is merely exemplary in nature, and is in no way intended to limit the invention or its applications or uses. For example, the system and method of the present invention has particular application for estimating the voltage set-point of the fuel cells in a fuel cell stack for a fuel cell vehicle. However, as would be appreciated by those skilled in the art, the system and method for estimating the peak stack voltage will have application for other fuel cell stacks and other applications.

Oxidation of platinum particles in a fuel cell as a result of voltage cycling creates a passivation layer in the cell electrode that prevents the particles from going into solution and being absorbed into the membrane. In other words, oxidation of the platinum particles in a fuel cell reduces the possibility of a reduction in catalyst surface area, which reduces cell degradation. Although the discussion herein refers to the catalyst as being platinum, those skilled in the art will readily understand that other metals can be used as a catalyst and that the catalyst may be in various concentrations, particle sizes, support material, etc.

It is believed that the loss of platinum catalyst in a fuel cell stack MEA occurs as a result of two competing reactions occurring in the MEA as identified by equations (1) and (2) below.

$$Pt+H_2O \rightarrow PtOH+H^++e- \qquad (1)$$

$$Pt \rightarrow Pt^{2+}+2e- \qquad (2)$$

The reaction of equation (2) is believed to be damaging to the catalyst, but the reaction of equation (1) is believed to be protective of the catalyst. Both of the reactions occur at high fuel cell voltage potentials, such as voltages greater than 0.7V and especially cell voltages greater than 0.9V. The reaction of equation (1) starts at a lower potential and proceeds much slower than the reaction of equation (2), which proceeds very fast at high voltage potentials, i.e., potentials greater than 0.85V.

The present invention proposes a process that reduces or prevents the reaction of equation (2), but favors the reaction of equation (1). An algorithm is proposed that controls the cell voltage potential by monitoring the PtOH levels using models, and keeps the potential low, i.e., less than 0.85V by capping the potential and/or rate of change of the potential until the PtOH level is high enough so that the reaction of equation (2) is prevented. Once the PtOH level is high, the cell voltage can be allowed to increase without extensively damaging the catalyst.

The algorithm determines a maximum average cell voltage set-point at various times during operation of the fuel cell system based on an estimate of the history of the cell voltage, the oxidation level and rate of oxidation of the platinum particles and the cell voltage. More particularly, the voltage set-point of the cells may be caused to ramp up from some lower voltage value to a relatively higher voltage value at some predetermined rate depending on the oxidation level of the platinum particles for that point in time. Therefore, as the power demand on the stack is reduced and the cell voltage increases, the amount of stack power used to charge the battery, or be dissipated in some other device, may be reduced as the platinum particles are allowed to oxidize, as the cell voltage increases to some maximum voltage level set-point.

As will be discussed in detail below, the present invention includes a method for periodically estimating the peak stack voltage of a fuel cell stack in a fuel cell system during operation of the fuel cell system that includes determining the platinum oxidation state. This estimated peak stack voltage allows the stack voltage set-point to be selectively low enough to provide protection against platinum catalyst surface area loss, and be high enough to provide stack operating efficiency. Generally, given certain stack conditions at a certain point in time, an algorithm estimates a target maximum average cell voltage (MAV), and using the MAV and existing fuel cell system parasitics, the algorithm estimates the minimum net power that the fuel cell system is expecting the fuel cell power system to request. Rather than lowering the MAV under all conditions, the present invention proposes to use a lower initial MAV under conditions with a high expected rate of damage and then increase the MAV to a steady state maximum.

FIG. 1 is a simplified block diagram of a fuel cell system 10 including a fuel cell stack 12, where the stack 12 includes a series of fuel cells 30. A compressor 14 provides an airflow to the cathode side of the fuel cell stack 12 on a cathode input line 16 and a cathode exhaust gas is output from the stack 12 on a cathode exhaust gas line 18. The anode side of the fuel cell stack 12 receives hydrogen gas from a hydrogen source 20 on an anode input line 20 and an anode exhaust gas is output from the stack 12 on an anode exhaust gas line 24. A component 32, such as a high voltage battery, is provided as a load for the power generated by the stack 12 to maintain the cell voltage at or below the desired maximum set-point as discussed herein. A monitoring device 26 monitors the voltage of the cells 30 in the fuel cell stack 12 and a controller 28 controls the operation of the system 10 including calculating the average cell voltage and generating the maximum voltage set-point of the cells 30, as will be discussed in detail below. The fuel cell system 10 is intended to represent any fuel cell system suitable for the process described herein, including anode recirculation systems, anode flow-shifting systems, etc.

Figure 2:
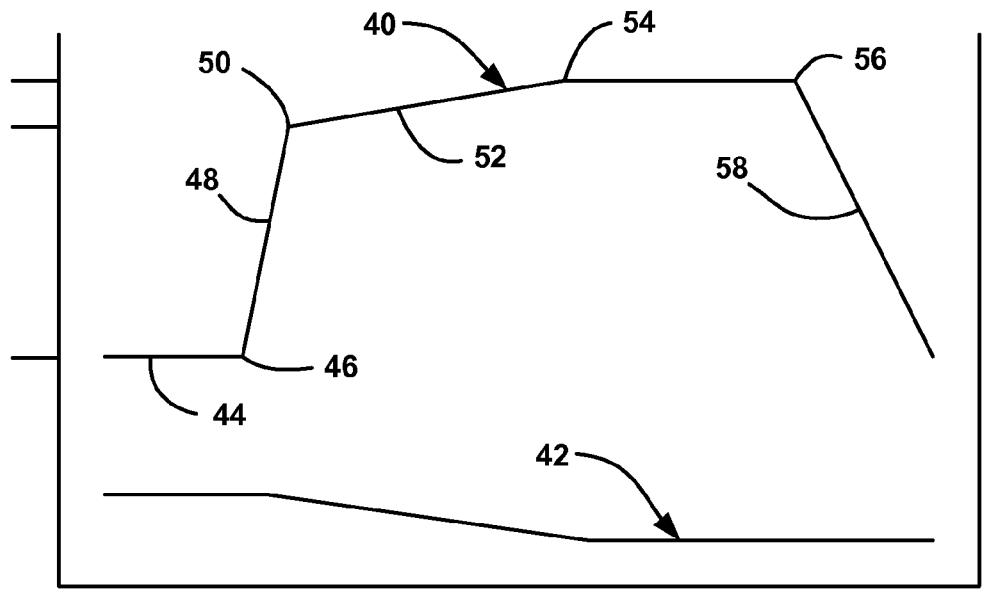
FIG. 2 is a graph with time on the horizontal axis, average cell voltage on the left vertical axis and minimum power request provided by a fuel cell power system on the right vertical axis.

FIG. 2 is a graph with time on the horizontal axis, average cell voltage on the left vertical axis and minimum power provided to a fuel cell power system on the right vertical axis. Graph line 40 shows an average cell voltage over time and graph line 42 shows the minimum power provided to the fuel cell power system that will provide the average cell voltage. The average cell voltage represented by graph line section 44 is a low average cell voltage that may occur as a result of the system 10 being off, the system 10 being at high power or the operation of the system 10 being at a cathode stoichiometry approaching 1. When the power request from the stack 12 goes low, and the average cell voltage increases at point 46, the algorithm allows the average cell voltage to quickly rise at graph line section 48 to a reduced average cell voltage point 50, for example, 850 mV, that is below the voltage threshold where significant dissolution of the platinum particles occurs as a result of voltage cycling. Thus, limited cell degradation occurs, but limited platinum particle oxidation may begin to occur. In other words, the voltage at the point 50 is selected to be just below the voltage where catalyst dissolution occurs, but where the voltage is high enough so that the stack 12 is not producing significant power that may be used inefficiently. Generally, oxidation of the catalyst will begin to occur at the voltage point 50, and as the cell voltage increases, the oxidation coverage of the catalyst will also increase at some rate depending on the particulars of the system, including the particular catalyst, where the rate of increase may be linear or not.

From the point 50, the algorithm then causes the average cell voltage to slowly increase on graph line section 52 to a maximum target average cell voltage at point 54. The target cell voltage at the point 54 is the steady-state maximum average cell voltage that is desired at low system power requests. The voltage at the point 54 is selected to be a desired relatively high voltage, for example, 900 mV, where catalyst degradation as a result of voltage cycling would occur, but the stack 12 would not be generating significant power that may otherwise be used inefficiently, as discussed above. The slow ramp up to the desired target voltage gives the platinum particles time to oxidize before the cell voltage reaches the critical degradation voltage at the point 54. During the slow voltage ramp up on the section 52, more stack power may need to be dissipated than if the average cell voltage was allowed to go immediately to the steady-state voltage, but the degradation of the platinum particles is reduced because of the oxidation. When a power up-transient is requested at point 56, the average cell voltage drops at graph line section 58. The graph line 42 illustrates the minimum power request from the stack 12 during the high average cell voltages.

Most of the time during normal system operation, the fuel cell stack 12 is not at a sustained low voltage. If the stack 12 has been at higher voltages, a less aggressive initial MAV can be used. The easiest approach to achieve this is to set the MAV as a function of cathode platinum oxide (PtOH) coverage. By knowing the platinum oxidation state, the voltage control of the system 10 can selectively determine the various voltage values that the maximum average cell voltage can be set to, and selectively determine the ramp up rate to the desired steady-state cell voltage for that oxidation level. An empirical dynamic PtOH model, that is a function of average cell voltage, can be developed for this purpose, as would be well understood by those skilled in the art. A primary input to the PtOH model would be an IR (current-resistance) corrected average cell voltage, which is equal to the average cell voltage plus stack current times cell resistance, where the cell resistance is either measured or estimated. Cathode relative humidity and stack temperature could also be used as inputs with the corrected voltage to generate a more accurate platinum oxidation state. The estimation of platinum oxide coverage could either be empirically based or more fundamental in form.

Figure 3:
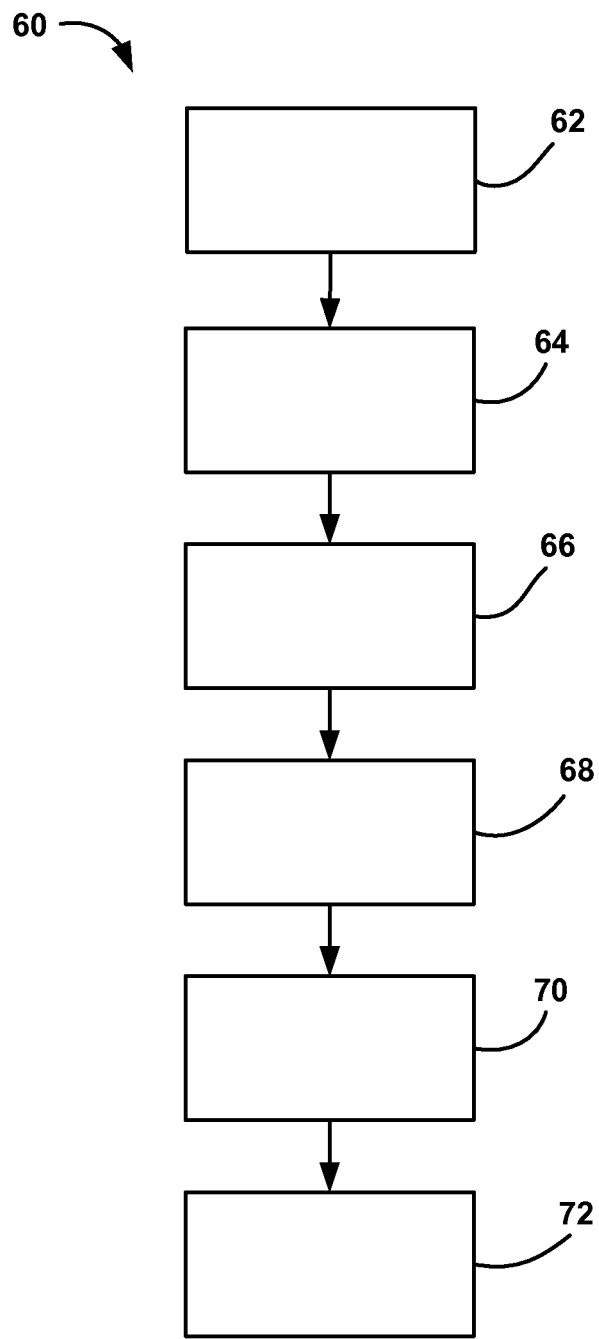
FIG. 3 is a flow chart diagram for determining and using a minimum requested power value from a fuel cell stack that considers a cell catalyst oxidation state during operation of a fuel cell stack.

FIG. 3 is a flow chart diagram 60 for determining and using a minimum requested power value from the fuel cell stack 12 that considers the oxidation state of the catalyst in the fuel cells 30, as discussed above. The algorithm determines and/or retrieves the average cell voltage, the stack current density and the internal resistance of the membranes of the cells 30 through various measurement and/or estimation processes at box 62 using any suitable technique, many of which would be well understood by those skilled in the art. The algorithm uses these values at box 64 to calculate the IR corrected average cell voltage of the fuel cells 30 in the stack 12 as referred to above. The algorithm then uses the IR corrected average cell voltage at box 66 to determine the oxidation state of the platinum or other catalyst. Other parameters, such as stack temperature, membrane humidification, etc, can also be used to determine the oxidation state of the platinum if desired. The algorithm then uses the oxidation state of the platinum at box 68 to determine the maximum average cell voltage set-point of the fuel cells 30 in the stack 12. The voltage set-point can be any voltage that allows the platinum particles to oxidize further, where the voltage set-point may be ramped up as discussed above depending on the oxidation state of the catalyst. That voltage set-point is then used to determine a minimum power request from the fuel cell stack 12 at box 70 so that the power drawn from the stack 12 causes the fuel cells 30 to operate at that voltage set-point. The power generated by the stack 12, beyond what is required for normal vehicle operation, is then used at box 72 to charge the battery or be dissipated in some component in the system 10 depending on the power value and other factors.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining a maximum average cell voltage set-point for fuel cells in a fuel cell stack, said method comprising:
   determining an IR corrected average cell voltage using the average cell voltage, stack current density (I) and membrane resistance (R);
   determining an oxidation state of a catalyst within the fuel cells based on the IR corrected voltage; and
   determining the maximum average cell voltage set-point based on the oxidation state of the catalyst.

2. The method according to claim 1 wherein determining the maximum average cell voltage set-point includes setting the voltage set-point to a first average cell voltage level and then causing the average cell voltage to ramp up to a second average cell voltage level.

3. The method according to claim 2 wherein the second average cell voltage level is about 850 mV and the third average cell voltage level is about 900 mV.

4. The method according to claim 1 wherein determining the oxidation state of the catalyst includes using stack temperature and membrane humidification in combination with the IR corrected voltage to determine the oxidation state of the catalyst.

5. The method according to claim 1 wherein determining the oxidation state of the catalyst includes using an empirical model.

6. The method according to claim 1 wherein the catalyst is platinum.

7. A system for determining a maximum average cell voltage set-point for fuel cells in a fuel cell stack, said system comprising:
   a controller programmed to provide:
   means for determining an IR corrected average cell voltage using the average cell voltage, stack current density (I) and membrane resistance (R);
   means for determining an oxidation state of a catalyst within the fuel cells based on the IR corrected voltage; and
   means for determining the maximum average cell voltage set-point based on the oxidation state of the catalyst.

8. The system according to claim 7 wherein the means for determining the maximum average cell voltage set-point sets the voltage set-point to a first average cell voltage level and then causes the average cell voltage to ramp up to a second average cell voltage level in a predetermined manner.

9. The system according to claim 8 wherein the second average cell voltage level is about 850 mV and the third average cell voltage level is about 900 mV.

10. The system according to claim 7 wherein the means for determining the oxidation state of the catalyst uses stack temperature and membrane humidification in combination with the IR corrected voltage to determine the oxidation state of the catalyst.

11. The system according to claim 7 wherein the means for determining the oxidation state of the catalyst uses an empirical model.

12. The system according to claim 7 wherein the catalyst is platinum.

* * * * *